Oct. 28, 1924.
B. F. HAGER
1,513,706
VEHICLE BODY BRACE
Filed Oct. 5, 1922
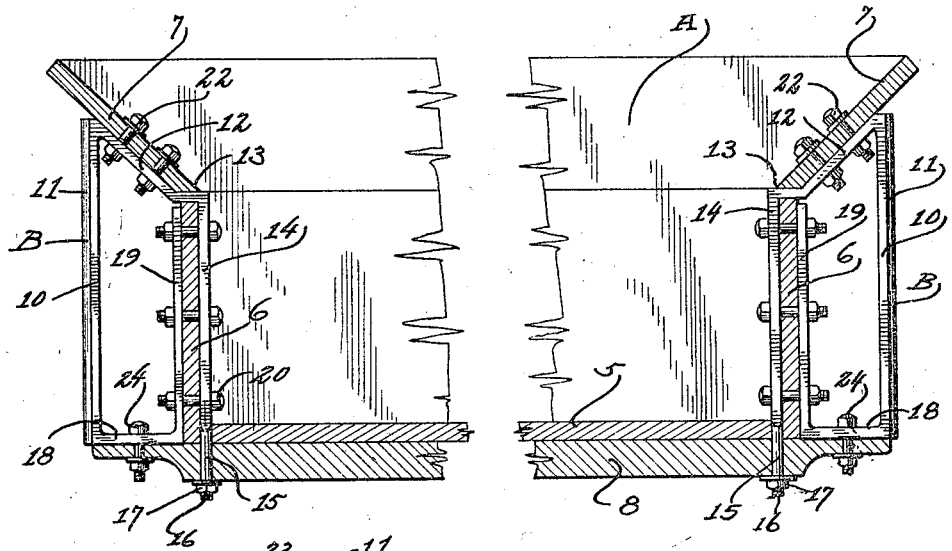
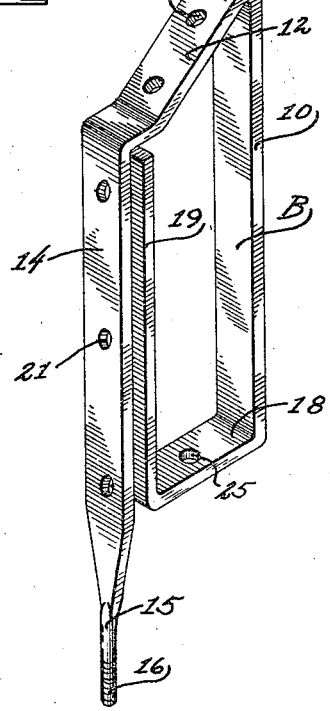
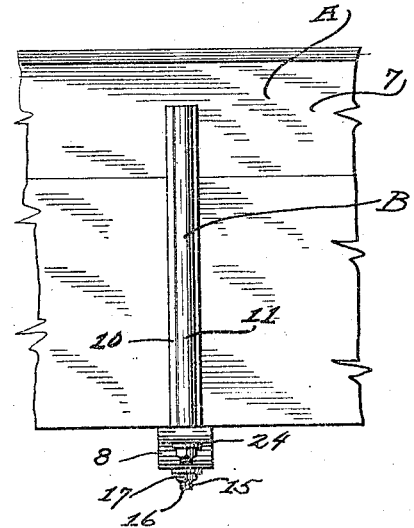
Inventor
Benjiman F. Hager
By Lancaster and Allwine
Attorneys Patented Oct. 28, 1924.

1,513,706

UNITED STATES PATENT OFFICE.

BENJAMIN F. HAGER, OF KEYSTONE, WEST VIRGINIA.

VEHICLE-BODY BRACE.

Application filed October 5, 1922. Serial No. 592,572.

*To all whom it may concern:*

Be it known that I, BENJAMIN F. HAGER, a citizen of the United States, residing at Keystone, in the county of McDowell and State of West Virginia, have invented certain new and useful Improvements in Vehicle-Body Braces, of which the following is a specification.

This invention relates to braces for vehicle bodies and the primary object of the invention is to provide an improved means for bracing the bodies of wagons and automobile trucks, so that the bodies will be able to stand great pressure and carry a large load.

Another object of the invention is to provide an improved vehicle body brace for supporting both the side walls of the body and the flaring boards thereof, the brace embodying members for engaging the opposite sides of the side walls of the body for forming an effective support therefor.

A further object of the invention is to provide an improved vehicle body brace formed from a single strip of strap iron or the like and which embodies inner and outer members for engaging the side wall of the body, an inclined member for engaging the flaring board of the body and a vertically disposed strut member extending from the inclined member to the cross bar of the vehicle body.

A further object of the invention is to provide an improved vehicle body brace of the above character which is durable and efficient in use, one that is simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a transverse section through a vehicle body, showing the improved brace members incorporated therewith.

Figure 3 is a detail perspective view of one of the brace members.

Figure 2 is a fragmentary side elevation of a vehicle body, showing one of the brace members incorporated therewith.

Referring to the drawings in detail, wherein similar reference characters designate corresponding parts throughout the several views, the letter A generally indicates the vehicle body and B the improved brace member therefor.

The vehicle body A can be of any preferred construction and as shown includes the lower wall 5, the side walls 6, the flaring boards 7 and the cross bars 8. The cross bars 8 of the vehicle body extend beyond the side walls 6 in the ordinary manner.

The improved brace B for the vehicle body is preferably constructed from a single strip of strap iron or the like and includes a vertically disposed supporting strut 10, the outer surface of which can be provided with a reinforcing rib 11. This vertically disposed strut 10 extends upwardly from the outer end of the cross bar 8 to the flaring board 7 at a point intermediate its ends. The upper end of the strut 10 carries an inwardly and downwardly extending inclined brace bar 12 which engages the outer face of the flaring board 7. The inner end of the inclined brace member supports a horizontally disposed extension 13 which is disposed between the upper and lower edges of the side wall 6 and the flaring board 7, and if desired, the upper edges of the side wall 6 can be suitably notched for receiving the same. An inner vertically disposed brace bar 14 is formed on the inner end of the horizontally disposed brace member 13 and engages the inner face of the side wall 6. The lower end of the inner vertical brace bar 14 has formed thereon a bolt extension 15 which is extended through the lower wall 5 of the body and through the cross bar 8 therefor. The lower end of the bolt section 15 is threaded as at 16 for the reception of a retaining nut 17.

The lower end of the vertical strut member 10 is provided with the inwardly extending horizontally disposed foot 18 which engages the upper surface of the extended end of the cross bar 8 and the inner end of this foot has formed thereon the upwardly extending brace bar 19 for engaging the outer face of the side wall 6.

The inner and outer brace bars 14 and 19 are connected together by suitable bolts 20 which are extended through the openings 21 formed in the brace bars. These bolts 20 of course, are extended through suitable openings formed in the side walls 6. It is obvious that these brace bars 14 and 19 engaging the opposite faces of the side walls form an effective support therefor and permit the same to withstand a great amount of strain. The inclined brace member 12 engages the lower face of the flaring board 7 and is securely connected to the flaring board by means of retaining bolts 22 which are extended through the flaring boards and through suitable openings 23 formed in the inclined brace member 12. The foot 18 is connected by means of a bolt 24 with the extended portion of cross bar 8 of the vehicle body and this bolt is extended through a suitable opening 25 formed in the foot and through the cross bar.

While the construction of the brace is extremely simple, the same forms an exceptionally durable and strong means for bracing the vehicle body, and not only is means provided for bracing the inner and outer faces of the side walls of the body but means is also provided for supporting the flaring boards and for forming a direct support therefor extending from the cross bars of the vehicle body to the lower faces of the flaring boards.

Changes in details may be made without departing from the spirit or the scope of this invention; but,

I claim:

1. The combination with a vehicle body including a bottom, side walls, a flaring board, and a cross bar extending beneath the bottom and beyond the side walls, of a bracing device having portions secured to the inner and outer faces of the side walls and other portions extending from the first mentioned portions and secured against the under face of the flaring board and upper face of the extended end portion of said cross bar, and a vertically disposed strut connecting the outer ends of the last mentioned portions and extending in spaced relation to the side walls.

2. The combination with a vehicle body including a bottom, side walls, a flaring board, and a cross bar extending beneath the bottom and beyond the side wall, of a bracing device comprising a vertically disposed strut extending between the flaring board and extended end portion of said cross bar in spaced relation to the side wall, a foot extending inwardly from the lower end of said strut, and secured to the extended end of said cross bar, a bracing arm extending upwardly from said foot against the outer face of said side wall, a side arm extending inwardly from the upper end of said strut and secured against the under face of said flaring board and passing between the flaring board and side wall, a depending arm extending from said side arm against the inner face of said side wall and having its lower end secured, and fasteners for the depending arm and upwardly extending arm extending through the side wall and holding said arms in tight engagement therewith.

3. The combination with a vehicle body including a bottom, side walls, a flaring board, and a cross bar extending beneath the bottom and beyond the side wall, of a bracing device formed of a metal strip bent to provide a strut extending vertically between the flaring board and extended end of said cross bar in spaced relation to said side wall and upper and lower arms extending inwardly from said strut, the lower arm being secured to said cross bar and bent to provide an upwardly extending brace engaging the outer face of said side wall, the upper arm being secured to the under face of said flaring board and extended between the flaring board and side wall and bent to provide a downwardly extending brace engaging the inner face of the side wall and terminating in a bolt forming extension passing through the bottom and cross bar, a fastener engaging the bolt extension beneath the cross bar, and fasteners extending through the side wall and inner and outer braces for holding the braces in tight engagement with the side wall.

BENJAMIN F. HAGER.